(12) United States Patent
Monnerat et al.

(10) Patent No.: US 7,786,931 B2
(45) Date of Patent: Aug. 31, 2010

(54) DETERMINING MOBILE TERMINAL POSITIONS USING ASSISTANCE DATA TRANSMITTED ON REQUEST

(75) Inventors: Michel Monnerat, L'Union (FR); Arnaud Masson, Tournefeuille (FR); Bruno Lobert, Pechabou (FR)

(73) Assignee: Alcatel, Paris (FR)

( * ) Notice: Subject to any disclaimer, the term of this patent is extended or adjusted under 35 U.S.C. 154(b) by 425 days.

(21) Appl. No.: 10/566,709

(22) PCT Filed: Jul. 12, 2004

(86) PCT No.: PCT/FR2004/001834

§ 371 (c)(1), (2), (4) Date: Feb. 1, 2006

(87) PCT Pub. No.: WO2005/022189

PCT Pub. Date: Mar. 10, 2005

(65) Prior Publication Data

US 2006/0238418 A1    Oct. 26, 2006

(30) Foreign Application Priority Data

Aug. 1, 2003 (FR) .................... 03 09509
Mar. 10, 2004 (FR) .................... 04 50480

(51) Int. Cl.
*G01S 1/00* (2006.01)
*H04W 24/00* (2009.01)
*G01S 5/14* (2006.01)

(52) U.S. Cl. .................... 342/357.09; 342/357.03; 455/456.1

(58) Field of Classification Search .................... 342/357.01–357.17; 455/456.1
See application file for complete search history.

(56) References Cited

U.S. PATENT DOCUMENTS

| 6,075,987 A | 6/2000 | Camp |
| 6,133,874 A | 10/2000 | Krasner |
| 6,323,803 B1 * | 11/2001 | Jolley et al. ............ 342/357.03 |
| 6,400,319 B1 | 6/2002 | Castelloe |
| 2002/0169550 A1 | 11/2002 | Humphrey et al. |
| 2004/0017311 A1 * | 1/2004 | Thomas et al. ............. 342/450 |
| 2005/0192024 A1 * | 9/2005 | Sheynblat ............... 455/456.1 |
| 2006/0276198 A1 * | 12/2006 | Michelon et al. ......... 455/456.1 |

* cited by examiner

*Primary Examiner* — Thomas H Tarcza
*Assistant Examiner* — Harry Liu
(74) *Attorney, Agent, or Firm* — Sughrue Mion, PLLC

(57) ABSTRACT

A mobile terminal (UE) comprises means (CR) for acquiring pseudo-random codes modulating signals received from positioning satellites (SN) in view belonging to a constellation (CS) and related to a reference time, and computation means (MC1-MC3) for determining its position received from the acquired codes and from navigation data contained in the signals. The acquisition means (CR), on receiving assistance data representing an approximate reference time and the approximate position of the terminal (UE), determine estimated positions of the satellites, estimated distances between the terminal and each of the satellites in view and associated Doppler effects as a function of pairs of hypotheses relating to the approximate reference time and the approximate position, and then determine a signal replica for each pair of hypotheses corresponding to the estimated positions and distances and to the associated Doppler effects over a selected time interval, and select the pair of hypotheses corresponding to the signal replica having the maximum correlation with the signal received during the time interval in order to determine the pseudo-random codes modulating the received signals.

46 Claims, 2 Drawing Sheets

DETERMINING MOBILE TERMINAL POSITIONS USING ASSISTANCE DATA TRANSMITTED ON REQUEST

BACKGROUND OF THE INVENTION

The invention relates to determining the position of mobile terminals by satellites.

In the present context, the expression "mobile terminal" refers equally to devices (or receivers) dedicated exclusively to satellite positioning and communication terminals equipped with a satellite positioning device, for example mobile telephones or personal digital assistants (PDA), where applicable of the communicating type.

As the person skilled in the art knows, satellite positioning comprises two steps. In the first or acquisition step, the mobile terminal in question determines the pseudo-random codes modulating signals coming from satellites that are "in view" and belong to a constellation of positioning satellites relative to a reference time generally called the "system time". The signals received from the satellites in view are "compared" to signal replicas resulting from hypotheses as to the system time and as to the timing frequency of the satellites, in order to deduce therefrom the pseudo-random codes that are modulating said received signals, in other words to synchronize the timing clock and frequency of the terminal to the clock and frequency of each satellite in view. To this end, correlation measurements are usually carried out based on pairs of time and frequency hypotheses.

In the present context, the expression "constellation of positioning satellites" refers to a radio navigation satellite service (RNSS) type positioning network, for example the GPS network, the GLONASS network or the future GALILEO network.

In the second step the position of the terminal is determined from the acquired codes and navigation data contained in particular in the signals received. More precisely, this second step may be divided into three sub-steps: a sub-step of determining the propagation times of signals between each of the satellites in view and the terminal from the acquired pseudo-random codes, a sub-step of determining pseudo-distances between the terminal and each of the satellites in view from the navigation data contained in the signals and the propagation times, and a sub-step of determining the position of the terminal from the pseudo-distances (at least by quadrilateration and more generally by finding a numerical solution to an equation with four unknowns and at least four measurements using a method of the least squares type). Four measurements are needed to solve the equation with four unknowns. In some conditions only three measurements are used by fixing one unknown, typically the altitude (Z) of the receiver, or a method may be used based on hybridization with external measurements.

The accuracy of each propagation time, and therefore of each pseudo-distance, directly determines the accuracy of the position. Now, the accuracy of each propagation time depends on the quality with which the pseudo-random codes are acquired from the corresponding received signal, which depends on the quality of said received signal. Consequently, the position determined is generally affected by errors if at least one of the signals received from a satellite in view is of poor quality, which occurs relatively frequently, especially in uneven and congested environments. It may even be temporarily impossible to determine the position of the terminal, even though the signals coming from the other satellites in view are of good quality.

SUMMARY OF THE INVENTION

Thus an object of the invention is to improve upon the above situation.

To this end it proposes a method dedicated to determining the position of a mobile terminal, including, as in the prior art, a step of acquiring pseudo-random codes followed by a step of determining the position of the terminal from the acquired pseudo-random codes and from navigation data contained in the signals received.

The method is characterized in that, in the acquisition step:
  assistance data is transmitted to the terminal, preferably at its request, representing the approximate reference time of the constellation and its approximate position,
  estimated positions of the constellation, estimated distances between the terminal and each of the satellites in view and associated Doppler effects are then determined as a function of pairs of hypotheses relating to the received approximate reference time and the received approximate position,
  a signal replica is then determined for each pair of hypotheses corresponding to the estimated positions and distances and to the associated Doppler effects over a selected time interval, and
the pair of hypotheses corresponding to the signal replica having a maximum correlation with the signal received during the selected time interval is selected in order to determine the pseudo-random codes modulating each of the received signals.

In other words, a "geographical position/system time" search is conducted, by correlating the signal with the composite signal equal to the sum of the replicas subject to the delay and the Doppler shift corresponding to a grid defining the position of the receiver (and therefore of its user) and the system time.

Accordingly, and in contrast to the prior art method, the pseudo-random codes associated with each of the signals coming from the satellites in view are determined after a common phase of accumulating the power of all the received signals over a selected time period (interval). This significantly improves the detection threshold because all of the available power is accumulated during the search.

The method of the invention may have other features, and in particular, separately or in combination:
  the assistance data is transmitted to the terminal via its communication network;
  the assistance data may include "augmentation" data, such as ephemerides, coming from a satellite based augmentation system (SBAS);
  if the mobile terminal is a communication terminal belonging to a cellular communication network each cell whereof is managed by a base station, the approximate position preferably represents the cell in which it is situated when it requests said assistance data; in this case, it is advantageous for the base station to supply the terminal with frequency and time assistance, the expression "frequency assistance" referring to resynchronizing its local oscillator using the oscillator of the base station; to this end, the timing clock of the terminal, which is used to determine its position, may be slaved to the timing clock of the base station that manages the cell in which it is situated, for example;
  selecting a signal replica may consist in determining for each signal replica a function representing its energy of correlation with the received signal during the selected time interval and then retaining the signal replica whose energy is the highest;

the assistance data may comprise complementary navigation data selected from the ephemerides of the satellites in view, first time corrections of the satellites in view, representing the time difference between the reference time and their timing clock, second time corrections representing disturbances to the propagation of the signals transmitted by the satellites in view induced by the ionosphere, and data representing a three-dimensional (3D) model of the cell in which the requesting terminal is situated;

each terminal may transmit to a server (assistance server) information data representing its position in order for that position to be stored in corresponding relationship to the identifier of the cell in which it is situated; in this case, auxiliary data representing the quality of the transmitted information data may also be stored in corresponding relationship to the identifier of the cell; in this way a three-dimensional model of the communication network may be generated from the cell identifiers and the corresponding information data and/or auxiliary data. In other words, in the case of an "MS-assisted" or "MS-based" mode of operation, the terminal sends its position and the number of its cell to the assistance server, which can then update a history of the positions (x, y, z) of all the mobiles that have been located in the cell; this results in a 3D digital terrain model together with information on the coverage of the cell; places where no location has been determined demonstrate a coverage problem; the level of detail of the map can be enhanced by transmitting the reception conditions;

measurements representing the dynamics of the mobile terminal may be effected, for example by means of micro-inertial MEMS devices, from which measurements and from assistance data are then estimated a speed, an acceleration and a variation of acceleration relative to each satellite in view, from which an induced phase is then deduced, and the signal replica is finally determined allowing for the induced phase.

The invention also relates to a mobile terminal comprising means for acquiring pseudo-random codes modulating signals received from satellites in view belonging to a constellation of positioning satellites and related to a reference time by "comparison" with signal replicas resulting from hypotheses, and computation means for determining the position of the terminal from the acquired codes and from navigation data contained in the received signals.

The mobile terminal is characterized in that the acquisition means, on receiving assistance data representing an approximate reference time and the approximate position of said terminal, preferably in response to a request, determine estimated positions of the constellation of satellites, estimated distances between the terminal and each of the satellites in view and associated Doppler effects as a function of pairs of hypotheses relating to the approximate reference time and the approximate position, and then determine a signal replica for each pair of hypotheses corresponding to the estimated positions and distances and to the associated Doppler effects over a selected time interval, and finally select the pair of hypotheses corresponding to the replica of the composite signal (the sum of the replicas subject to the Doppler effect and the time difference corresponding to the hypotheses) having a maximum correlation with the received signal during the selected time interval in order to acquire the signal (synchronization to the signals from the various satellites or, here, pre-location of the terminal (or receiver)).

The mobile terminal of the invention may have other features, and in particular, separately or in combination:

it may include reception means adapted to receive SBAS frames from an SBAS connected to the satellite navigation system;

it may be adapted to communicate within a cellular communication network, the approximate position received then representing the cell in which it is situated at the time it requested the assistance data; in this case, the terminal may be adapted to use frequency and time assistance supplied by the base station of the cellular network to which it is temporarily connected; for example, the timing clock of the acquisition means is preferably slaved to the timing clock of the base station that manages the cell in which it is situated;

it may include acquisition means for correlating a particular replica with the received signal during the selected time interval, for example using a function representing a correlation energy, in order to identify a spreading code, it may be configured to transmit to an assistance server information data representing its position, in order for the data to be stored in a database in corresponding relationship to the identifier of the cell in which it is situated;

it may comprise a micro-inertia measuring device, preferably in the form of a micro-electro-mechanical system (MEMS), adapted to deliver measurements representing the dynamics of said terminal; in this case, the acquisition means are adapted to estimate from the measurements and from assistance data a speed, an acceleration and a variation of acceleration relative to each satellite in view, to deduce therefrom an induced phase, and then to determine the signal replica taking account of the induced phase.

The invention further relates to an assistance server connected to a cellular communication network and adapted to transmit assistance data to mobile terminals of the type defined hereinabove, at the request thereof, and preferably via their mobile communication network.

For example, the server may transmit to the requesting terminals assistance data comprising complementary navigation data selected from a group comprising at least ephemerides of the satellites in view, first time corrections for the satellites in view representing the clock error of the satellites relative to the time of the constellation of positioning satellites, second time corrections representing disturbances induced by the ionosphere to the propagation of the signals transmitted by the satellites in view, and data representing a three-dimensional model of the cell in which the requesting terminal is situated.

The server may equally comprise processing means which, when they receive information data representing the position of a terminal, store that data in a database in corresponding relationship to the identifier of the cell of the cellular communication network in which the terminal is situated. In this case, the processing means may also determine auxiliary data representing the quality of the information data received and then store it in corresponding relationship to the cell identifier.

Moreover, the processing means may manage and then store in the database a three-dimensional model of the communication network based on corresponding cell identifiers and information data and/or auxiliary data. They may equally extract from the database a portion of the three-dimensional model of the communication network representing the three-dimensional model of the cell in which the requesting terminal is situated, in order to transmit thereto the portion of the 3D model representing the terrain of the cell in which it is situated. This enriches the meshing (geographical position/ system time) and may enable the position of the mobile terminal to be determined with only three satellites in view (in which case there are only three independent unknowns, as the altitude Z is known for each pair (x, y)).

Alternatively, the processing means may merely extract from a database in which portions of a three-dimensional model of the communication network are stored in corresponding relationship to cell identifiers the portion of the model stored in corresponding relationship to the identifier of the cell in which a requesting terminal is situated, in order to transmit thereto the extracted portion.

The invention is particularly well adapted, although this is not limiting on the invention, to phase-modulated multiple-access L-band signals, in particular W-CDMA signals. Moreover, the invention is particularly well adapted, although this is also not limiting on the invention, to GNSS type satellite positioning systems, more particularly those of the GPS type, and to SBAS type augmentation systems.

Other features and advantages of the invention will become apparent on reading the following detailed description and examining the appended drawings, in which:

The appended drawings constitute part of the description of the invention as well as contributing to the definition of the invention, if necessary.

DETAILED DESCRIPTION OF THE INVENTION

The invention relates to determining the positions of mobile terminals in a telecommunication installation.

In the present context, the expression "telecommunication installation" refers to an installation including at least one communication network communicating with mobile terminals and an "assistance" (or aid) system for broadcasting assistance data, and in particular complementary navigation data concerning a positioning system, for example a satellite positioning system.

Moreover, in the present context, the expression "mobile terminal" (UE), refers to any type of terminal capable of receiving at least signals containing navigation data from the satellite positioning network and assistance data from the assistance system. They could therefore be simple portable satellite positioning devices, or devices on a land, sea or air vehicle and implementing at least one application linked to positioning, or mobile telephones, personal digital assistants (PDA) or laptop computers equipped with that kind of satellite positioning device and running at least one application linked to positioning.

Figure 1:
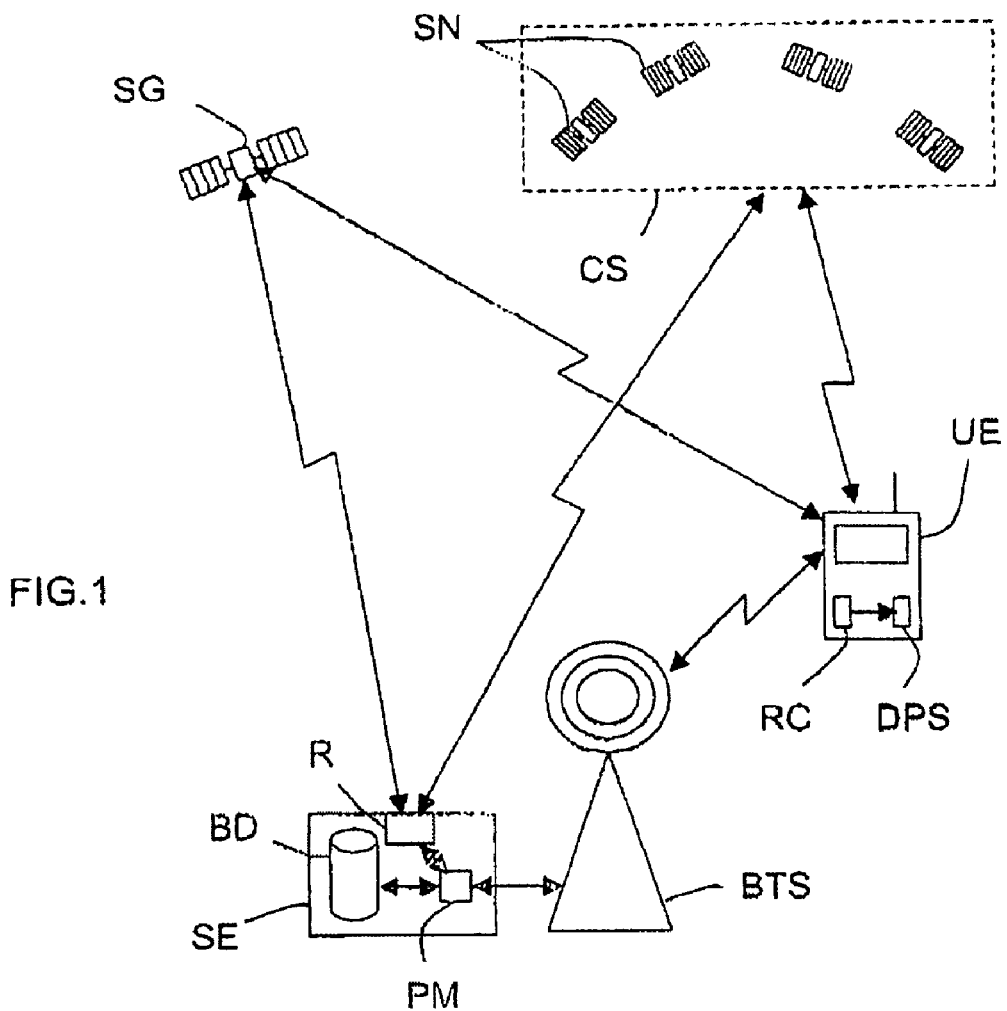
FIG. 1 is a diagram of one embodiment of a telecommunication installation enabling implementation of the method of the invention.

It is considered hereinafter by way of example that the installation includes not only at least one radio mobile communication network (here represented by one of its base stations BTS), but also a satellite positioning network (represented by its constellation CS of satellites SN), as shown in FIG. 1. Here that mobile communication network is of the cellular type, for example a GMS/GPRS or UMTS network (or any equivalent thereof).

Of course, the installation could be a hybrid installation. In the present context, the expression "hybrid installation" refers to a satellite communications installation including one or more sending stations, one or more telecommunications satellites, and a multiplicity of terrestrial repeaters installed at selected locations in the network.

The satellite positioning network is of the radio navigation satellite system (RNSS) type. It is the GPS network, for example, but could be of any other RNSS network type, for example the GLONASS network or the future GALILEO network, or a combination of at least two of the aforementioned three networks. This satellite positioning network CS may, as is the case here, be connected to an augmentation system, for example a satellite based augmentation system (SBAS), broadcasting from geosynchronous satellites SG frames containing in particular navigation data concerning the CS constellation that is generated by one or more ground stations (not shown). However, any other type of augmentation system may be envisaged, whether local or accessible via the Internet.

The cellular communication network includes an assistance server SE which in this instance is connected to the base station BTS for reasons of simplification. Here the assistance server SE includes a navigation receiver R capable of receiving from the constellation CS GPS signals (or more generally RNSS signals). The RNSS receiver R may also be capable of receiving signals from the augmentation system SBAS.

It is considered hereinafter, by way of illustrative example, that the mobile terminals UE are mobile telephones able to communicate with the cellular network and in particular with its base stations BTS using a transmitter/receiver ER and able to communicate with the satellite positioning network CS and the augmentation system (SG) using a DPS satellite positioning device, for example of the GPS type, hereinafter referred to as the DPS device.

The configuration and overall mode of operation of the installation are entirely conventional and will not be described in further detail. The invention relates more particularly to the acquisition method used by the mobile terminals cooperating with the assistance server SE and where applicable with the ground station(s) of the augmentation system. In other words, the invention relates neither to the operation of the satellite navigation system CS nor to that of an augmentation system, for example of the SBAS type, both of which remain unchanged relative to their prior art counterparts.

The SBAS messages contain data for correcting the navigation data supplied by the positioning satellites SN of the constellation CS in order to enhance the quality (accuracy, integrity, continuity and availability) of the position as determined by a DPS device in a mobile telephone UE. To be more precise, the SBAS data is generally used to correct time synchronization errors between navigation satellites SN and/ or ephemerides errors and/or propagation errors. It may also contain information relating to the integrity of the navigation data and ionospheric corrections.

The RNSS receiver R of the assistance server SE is therefore here responsible for recovering not only data (or GPS signals) coming from the constellation GS but also SBAS signals (or messages) sent by the geosynchronous satellite SG of the augmentation system, in order for said assistance server SE to enrich the assistance data, of the assistance messages intended for the mobile terminals UE, with the data that those signals contain.

The assistance data is enriched by means of the SBAS data in one of the following ways:

The navigation model (ephemerides) is modified so that it takes account of the SBAS corrections (Fast Corrections, Long Term Corrections, Ionosphere Corrections and Clock Corrections).

The server broadcasts to the mobile local differential corrections computed from the SBAS data. The server may further provide logic for choosing between:

local differential corrections provided by a reference receiver if the mobile for which the corrections are intended is close to the reference receiver, local differential corrections obtained from the corrections broadcast by the SBAS (WAAS, EGNOS, MSAS, etc.) when an element shows that those corrections result in greater accuracy than those produced by a reference receiver, in particular if the mobile is far from the reference receiver.

It should be borne in mind that the timing clocks of the positioning satellites SN of the constellation CS are synchronized with each other so that the constellation CS has a reference time also known as the system time (here called the GPS time).

Moreover, each positioning satellite SN transmits spread spectra in the form of phase-modulated multiple-access L-band signals referenced to the GPS time. For example, the signals are modulated and coded using the W-CDMA technique. That type of modulation being familiar to the person skilled in the art, it need not be described in detail. Suffice to say that the L-band (or other) carrier is spread-spectrum (BPSK) modulated using a binary code resulting from the modulo 2 sum of a pseudo-random code selected from a list of mutually orthogonal codes, for example Gold codes.

To be more precise, in a system of the GPS type, each positioning satellite SN transmits signals in band L1 (1575.42 MHz) modulated by two pseudo-random codes known as C/A codes (coarse acquisition codes) and P codes (also called Y codes if they are encrypted), generally together with signals in band L2 (1277.6 MHz) modulated by a pseudo-random Y code.

These modulated signals also contain navigation data, for example the GPS time of the constellation CS, their transmission time and the ephemerides of the positioning satellite SN that transmitted them.

The objective of a DPS device is therefore firstly to synchronize to the signals that it receives from the positioning satellites SN in view, in order to be able to determine the propagation time of each received signal between the satellite SN concerned and its mobile telephone UE, then navigation data contained in those signals and complementary navigation data contained in frames broadcast by the augmentation system (SG), and finally the position of said mobile telephone UE.

To this end, and as indicated in the introduction, the DPS device performs two main steps, namely a step of acquisition of the pseudo-random codes and a position determination step. The invention relates primarily to the acquisition step.

The determination step being unchanged compared to that used in the prior art DPS devices, only its main substeps are discussed hereinafter.

Figure 2:
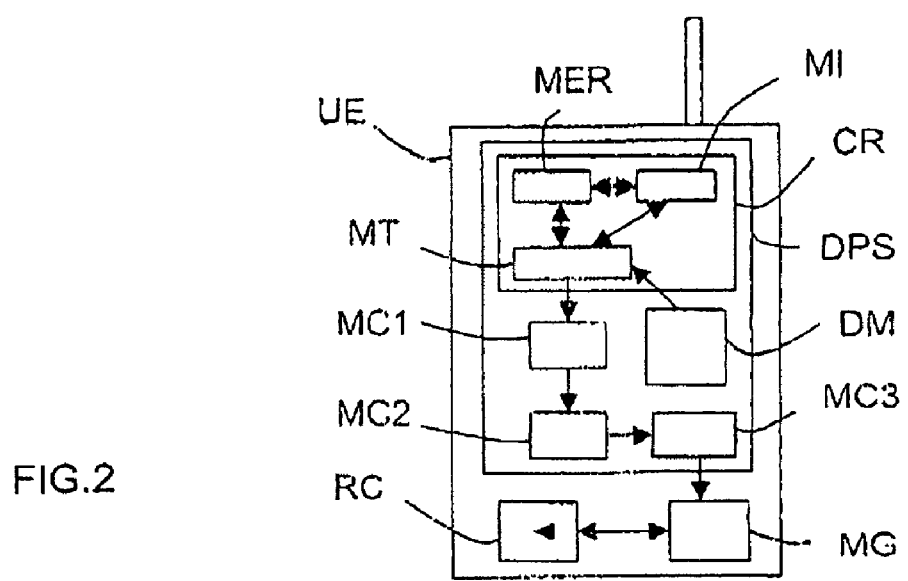
FIG. 2 is a diagram of one embodiment of a mobile communication terminal of the invention.

As is shown better in FIG. 2, each DPS device comprises a card CR dedicated to receiving signals (in band L in the case of the GPS) containing navigation information, generally in the form of data, transmitted by the constellation CS, and where appropriate SBAS frames containing complementary navigation data coming from the augmentation system (SG), and to acquiring the pseudo-random codes. The card CR is locked to the transmission frequencies L1 and L2 of the positioning satellites SN, for example. The transmission frequency of the geostationary satellite SG of the augmentation system is usually the frequency L1. The card CR is also adapted to receive assistance messages from the mobile telephone network.

The card CR therefore executes the acquisition step of the invention. To this end, it comprises firstly an interrogation module MI which, when it deems it necessary, sends the assistance server SE a message requesting it to transmit to its mobile telephone UE assistance data representing at least the approximate reference time (or GPS time or system time) of the constellation CS (constellation CS synchronization information) and its approximate position (a pre-location in the form of the cell in which it is located, or some other position if it leaves the coverage of the assistance network).

As will emerge hereinafter, the assistance data may also consist of complementary navigation data used during the position determination step, for example numbers of PRN in view, ephemerides of the satellites, ionosphere corrections, clock corrections and a digital model of the cell terrain, for example a three-dimensional (3D) model.

Messages requesting the assistance of the assistance system are transmitted to the assistance server SE by the send/receive module MER of the card CR of the terminal UE in the same way as conventional communication data. They contain the identifier of the mobile telephone UE concerned, of course. Moreover, the DPS device here being installed in a mobile telephone UE belonging to a cellular network, it is assumed to be situated in one of the cells of the network at the time it generates its request. Consequently, the interrogation module MI can integrate into its assistance request message (even if that information usually remains internal to the network) the position of the cell (or its identifier) in which its DPS device is situated and that it has obtained from the management module MG of the mobile telephone UE.

Moreover, it is particularly advantageous to slave the timing clock of the DPS device of the mobile telephone UE to the timing clock of the base station BTS that manages the cell in which it is situated. The clock of the base station BTS is much more accurate than that of the mobile telephone UE.

The assistance server SE preferably includes a database BD containing the approximate GPS time of the constellation CS and the positions of a reference point of each cell of the cellular network, for example its center. If not, the assistance server SE must interrogate the cellular network for the latter to send it the position of the cell concerned. Moreover, when the assistance request message also requests complementary navigation data relating to certain positioning satellites, the assistance server SE, by means of its RNSS receiver R, monitors navigation messages and signals coming in particular from the navigation constellation CS.

Once in possession of the assistance data, the assistance server SE communicates it to the requesting terminal UE via the cellular network.

The card CR receives the assistance data and communicates it to its processing module MT for constituting pairs of hypotheses as to the actual GPS time and its actual position from the approximate GPS time and the approximate position received.

Then, once the pairs of hypotheses have been constructed, the processing module MT determines for each pair estimated absolute positions of the satellites SN of the constellation CS.

It then determines for each pair of hypotheses, from the estimated positions of the constellation in view, the estimated distances between the mobile telephone UE and each of the positioning satellites SN in view.

It then determines for each pair of hypotheses the Doppler effect associated with each of the positioning satellites SN in view, given their approximate positions and their distances from the mobile telephone UE.

Once in possession of the estimated values of the positions, distances and Doppler effects for each pair of hypotheses, the processing module MT can then determine for each pair of hypotheses a signal replica S corresponding to the sum (or accumulation) of the L-band signals that should be received from the satellites SN in view during the selected time interval, given the pair of hypotheses concerned. The following equation is one example of a signal replica in the case of position/time pairs of hypotheses:

$$S_{k,n}(t) = \sum_{i=1}^{N_{SAT}} C_i(t - \tau_{i,k,n}) e^{2\pi i f_{i,k,n} t}$$

In the above equation, (k,n) designates the pair of geographical position/time hypotheses, i designates a satellite SN in view, $N_{SAT}$ designates the number of satellites SN in view, $C_i$ designates the spreading code of the satellite i, $\tau_{i,k,n}$ designates the time delay between the GPS transmission time and the time of reception received from the satellite i, and $f_{i,k,n}$ designates the timing frequency received from the clock of the satellite SN in view and corrected using the constellation time/approximate position hypothesis for the terminal UE.

This accumulation of the received signal over a selected time interval is possible here because the satellites SN of the constellation CS are synchronized.

The processing module MT then selects the pair of hypotheses that corresponds to the signal replica that has the maximum correlation with the signal received (or accumulated) during that time interval.

To this end, it preferably determines, for each signal replica, and therefore for each pair of hypotheses, a function representing its correlation energy with the sum of the signals actually received over the selected interval. This advantageously exploits the accumulation of the signals over the selected time interval. The estimation of a correlation function is greatly facilitated if the signal has a high signal to noise ratio.

The processing module MT then selects the signal replica that has the highest (correlation) energy.

The signal replica selected corresponds to a pair of hypotheses and selecting it therefore selects that pair of hypotheses. In other words, at the end of this process the processing module MT has the most probable GPS time and position of the mobile telephone UE. It can therefore synchronize on each signal received from a satellite SN in view in order to determine the pseudo-random codes used to modulate it.

Once the pseudo-random codes have been determined, and thus once synchronization to the pseudo-random codes has been effected, the processing module MT must estimate the synchronizations precisely and then, where applicable, perform the necessary demodulation.

However, it is preferable to envisage additional processing prior to demodulation. The SBAS type augmentation system and the GPS type satellite positioning network use a spectrum spreading technique based on periodic sequences of spreading codes, for example Gold codes. Now, the duration of those sequences is generally twenty times shorter than the duration of an information bit of the signal. Consequently, the phase of synchronizing to the pseudo-random codes should preferably be followed by a bit synchronization step.

Bit synchronization may consist, for example, after synchronizing the pseudo-random codes, in despreading the signal at the timing frequency of the sequence of codes, i.e. at 1 kHz. This is followed by frequency detection by applying a fast Fourier transform (FFT) to the despread signal. This enables the residual Doppler effect to be estimated with an uncertainty of less than around 25 Hz. To this end, an FFT may be applied to 1024 samples, for example, corresponding to approximately one second (1 s). The detected frequency is then corrected. Finally, using a dedicated operator, the bit transition is determined by considering that the sequence of codes is synchronized to the bit and that each bit consists of twenty (20) complete pseudo-random codes, which corresponds to 20×1 ms.

The dedicated operator used may be of the following type, for example, in which S represents a sample of the despread signal at 1 kHz:

$$S(n) = \sum_{i=1}^{Nbit} \left| \sum_{k=1}^{20} S_{k+20^*i+n} - \sum_{k=1}^{20} S_{k+20^*(i-1)+n} \right|^2$$

For example, the signal S is computed over a number of bits (Nbit) equal to fifty (50) for a signal duration of one second.

The bit transition is given by the maximum of S(n) when n varies from 0 to 19.

This type of bit synchronization is particularly advantageous because it consumes little computation time. It also decorrelates estimation problems introduced by processing the GPS signals.

Once bit synchronization has been effected, the position determination step may commence.

To this end the DPS device includes a first computation module MC1 for determining for each demodulated signal the bit propagation time between the satellite SN in view that sent it and the mobile telephone UE (or to be more precise its DPS device). To this end, it uses the transmission time of the signal incorporated into said signal by the satellite that sent it and the reception time associated with the signal by the send/receive module MER of the DPS device when it is received.

These propagation times are fed to a second computation module MC2 for determining the pseudo-distance between the mobile telephone UE and the corresponding satellite SN in view from navigation data contained in each signal and complementary navigation data contained in the conventional and/or assistance SBAS messages received from the assistance system (server SE), and the associated propagation time.

The assistance data, which may replace or complement the data extracted from the messages (or signals) coming from the satellites SN and may be transmitted to a DPS device by the assistance system (assistance server SE), consists, for example, of the ephemerides of the positioning satellites SN in view from the mobile telephone UE concerned and/or time corrections for the positioning satellites SN in view from the mobile telephone UE concerned, representing the time difference between the GPS time and the timing clock of the DPS device of the mobile telephone UE concerned, and/or second time corrections representing disturbances induced by the ionosphere to the propagation of the signals transmitted by the positioning satellites SN in view of the mobile telephone UE concerned, and/or data representing a three-dimensional (3D) model of the cell in which the requesting terminal is situated.

The second computation module MC2 uses the complementary navigation data, and in particular the correction data, to correct the navigation data transmitted in the L-band signals by the satellites SN in view. The data is used to increase processing sensitivity and consequently to enhance computation accuracy.

However certain navigation data, for example the data of the 3D model, may also be used in the subsequent position determination phase.

The pseudo-distances associated with each satellite SN in view determined by the second computation module MC2 are fed to a third computation module MC3 for determining the position of the mobile telephone UE. To be more precise, the third computation module MC3 determines this position from the pseudo-distances (of which there are generally four (4)) and from certain corrected navigation data and/or certain assistance data, for example the data of the 3D model of the cell in which its mobile telephone UE is situated, at least by quadrilateration and more generally by applying to at least four measurements a numerical solution method of the least squares type for four unknowns.

The 3D model may be particularly useful if the third computation model MC3 has only three pseudo-distances for determining the position of the mobile telephone UE, which can happen in particular in difficult environments in which the mobile telephone UE sees only three satellites SN.

The output of the third computation module MC3 feeds the management device MG of the mobile telephone UE with positions.

The DPS device of the invention, and in particular its interrogation module MI, processing module MT and computation modules MC1, MC2 and MC3, may take the form of electronic circuits, software (or electronic data processing) modules, or a combination of circuits and software.

It is important to note that the 3D model of a cell of a cellular network (which may be transmitted by the assistance system (assistance server SE) to a mobile terminal UE in the form of complementary navigation data) may be produced from position computations carried out by the various mobile terminals UE belonging to said cellular network.

Each DPS device sending the assistance server SE of the assistance system the pseudo-distances determined by its second computation module MC2 (in an "MS-assisted" type mode of operation) or the positions determined by its third computation module MC3 (in an "MS-based" type operating mode), accompanied by the identifier of the cell in which it is installed, may be envisaged.

The assistance server SE then comprises a processing module PM which, upon receiving information data representing the position of a mobile terminal UE (pseudo-distances or positions), stores it in its database BD in corresponding relationship to the identifier of the cell of the cellular network in which that mobile terminal UE is situated.

In this case, the processing module PM preferably determines auxiliary data representing the quality of the information data received and then stores it in corresponding relationship to the cell identifier. Here the term "quality" refers to a physical parameter such as the intensity or level of the received GSM signal, for example. The auxiliary data may in particular be useful to the operator of the mobile telephone network.

It is also particularly advantageous for the processing module PM to produce progressively a three-dimensional (3D) model of the cellular network from cell identifiers and corresponding information data and/or auxiliary data. To be more precise, the processing module PM can determine the coverage area of each cell of the network because it knows the locations from which the mobile telephones UE are in a position to communicate. Of course, the 3D model of the network is stored in the database BD of the assistance server SE, and may be updated continuously, periodically or on demand, according to what is required.

As indicated above, a portion of the 3D model of the network representing a cell may then be transmitted to the mobile terminal UE that requests it, in the form of complementary navigation data.

Thanks to this information on the network, obtained passively, without it being necessary to carry out any measurements, the operator of the network has valuable three-dimensional (3D) information enabling it to improve the geographical coverage of its network or to carry out maintenance or repairs. It is possible to determine in this way shadow areas or areas in which a technical problem has arisen (shadow areas of the RNSS system or shadow areas of the mobile communication network). Shadow areas of the augmentation system can also be determined in this way.

Generating the 3D model of the cellular network at the request of its operator may also be envisaged. In this case, the devices DPS are sent, preferably via the assistance system (SE), a message requesting them to transmit pseudo-distances or positions that they determine during a selected time period.

Alternatively, the 3D model of the cellular network not being determined by the assistance server SE may be envisaged. The mobile telephones can be configured so that they send the information data representing pseudo-distances or positions computed by their DPS device to the cellular network (and not to the assistance server SE). In this case, the 3D model of the network is transmitted to the assistance system SE by the cellular network in order to be stored in its database BD and then transmitted in the form of complementary navigation data to the devices DPS.

The DPS device of the invention may also take account of the dynamics of the mobile terminal UE in which it is installed.

Synchronization to the signal received from a satellite SN relates not only to the delay between the signal received (to be more precise to the spreading of the codes) and the replica generated at the level of the DPS device, but also to the difference between the frequency of the DPS device and the frequency of the received signal.

In particular, frequency uncertainty is caused by uncertainty in respect of the local oscillator, the Doppler effect caused by movement of the satellite and the Doppler effect caused by movement of the mobile terminal UE.

It may be shown that the duration of the time interval assigned to detecting the maximum correlation has a direct impact on performance. The greater this duration (which is called the "coherent integration time"), the better the noise rejection. Consequently, the signal to noise ratio after correlation is inversely proportional to the coherent integration time. In other words, the sensitivity of the DPS device is enhanced by increasing the coherent integration time.

Moreover, the discretization increment ($\delta f$) in the frequency domain is inversely proportional to the coherent integration time (Ti) (the equation $\delta f = \frac{1}{2} Ti$ typically applies). This minimizes losses during coherent integration.

It follows from the above remarks that when a frequency hypothesis or a geographical position hypothesis is tested, the DPS device becomes more sensitive to a change of frequency during the integration phase as the discretization increment is reduced. The dynamics of a mobile terminal UE inherently vary the phase of the received signal and therefore inherently induce frequency changes. Consequently, improving DPS sensitivity entails taking into account the dynamics of the mobile terminal UE in which it is installed.

This phenomenon is a more serious problem if reception conditions are poor.

To attempt to remedy this, it has been proposed to limit the coherent integration time in order for the discretization increment not to be too small. The width of the discretization increment is typically limited to around 500 Hz, which corresponds to a coherent integration time of the order of 1 ms. Accordingly, compared to a single 20 ms coherent integration time, by effecting a coherent accumulation of energy of the kind described above during a period of 20 ms based on twenty coherent integration times each of 1 ms, the loss is around 6.5 dB.

Another aspect of the invention therefore has the object of effecting an improvement by directly estimating the dynamics of the mobile terminal UE during integration rather than artificially limiting the coherent integration time.

To this end the invention proposes to install in the mobile terminal UE, and preferably in its satellite positioning DPS device, a measuring device DM for measuring its movement, its speed and its acceleration during the coherent integration time.

The measuring device DM preferably takes the form of a micro-inertia micro-electro-mechanical system (MEMS). Any type of micro-inertia MEMS may be envisaged, and in particular those using a cantilever, one or more suspended blades or a partially suspended H-shaped structure.

On the basis of the measurements delivered by the measuring device DM and the assistance data cited above, and in particular the positions of the satellites and the pre-location of the mobile terminal UE, the processing module MT of the DPS device can estimate the speed, the acceleration $\gamma$ and the acceleration variation $d\gamma/dt$ (also known as the "jerk") relative to each satellite SN in view, and deduce therefrom the induced phase to be taken into account in computing the signal replica during coherent integration (accumulation).

The replica of the signal can then be determined using an equation derived from the following equation, which corresponds to the situation of pairs of hypotheses of the scanned grid (position/system time):

$$S = \int_0^{Ti} S_r(t) r(t-\tau) e^{2\pi j \left( w_0 t + \frac{1}{2} w_0 \frac{\gamma}{c} t^2 + \frac{1}{3} w_0 \frac{d\gamma}{dt} t^3 \right)}$$

in which $w_0$ is the tested frequency discretization increment.

In this way, the coherent integration time may be increased and a pilot tone may be used, including during the acquisition phase. The pilot tone is a signal with no data, for example phase modulation of a pure spread carrier. Furthermore, the measurements delivered by the measuring device DM relate to parameters that vary very quickly with time and are therefore particularly well suited to short integration times.

The invention also provides a method dedicated to determining the position of a mobile terminal UE and, like the prior art method, comprising a step of acquiring pseudo-random codes followed by a step of determining the position of the mobile terminal UE from the pseudo-random codes acquired and from the navigation data contained in the received signals (read in the received navigation signals or in the assistance messages).

This may in particular be effected with the aid of the installation and the mobile terminals UE described above. The main and optional functions and subfunctions of the steps of the method being substantially identical to those of the various means constituting the installation and the mobile terminals UE, there are summarized hereinafter only the steps implementing the main functions of the method of the invention.

That method consists in:
transmitting to the mobile terminal UE, preferably at its request, assistance data representing the approximate reference time (GPS time) of the constellation CS and its approximate position, where appropriate with ephemerides, ionosphere corrections and the like, then, determining estimated positions of the constellation CS, estimated distances between the mobile terminal UE and each of the satellites SN in view and the associated Doppler effects as a function of pairs of hypotheses relating to the approximate reference time and the approximate position received, then, determining for each pair of hypotheses a signal replica corresponding to the estimated positions and distances and to the associated Doppler effects over a selected time interval, and selecting the pair of hypotheses that corresponds to the signal replica that has the maximum correlation with the received signal during the selected time interval, in order to determine the pseudo-random codes modulating each of the received signals.

The invention is not limited to the embodiments of the mobile terminal, assistance server and method described above by way of example only, and encompasses all variants that the person skilled in the art might envisage that fall within the scope of the following claims.

Accordingly, although there is described hereinabove an installation in which the telecommunication network is a cellular GSM/GPRS or UMTS type cellular network, the invention also concerns radio telecommunication networks of the hybrid satellite type with terrestrial repeaters.

Another embodiment that seeks to enrich the assistance data by sending three-dimensional information on the cell in which the mobile is located consists in:
the assistance data server broadcasting to the mobile a probability density of masking of the signals coming from the constellation of navigation satellites as a function of the elevation and the azimuth from the point of view of the mobile, and the mobile using that information:
either to initiate its satellite search, beginning with the satellites having the lowest possible blocking probability,
or to improve a multipath algorithm by deducing a probability of reflection by observation of the blocking probability density.

The advantage of an embodiment of this type is a saving in terms of the quantity of data transmitted from the server to the mobile.

Figure 3:
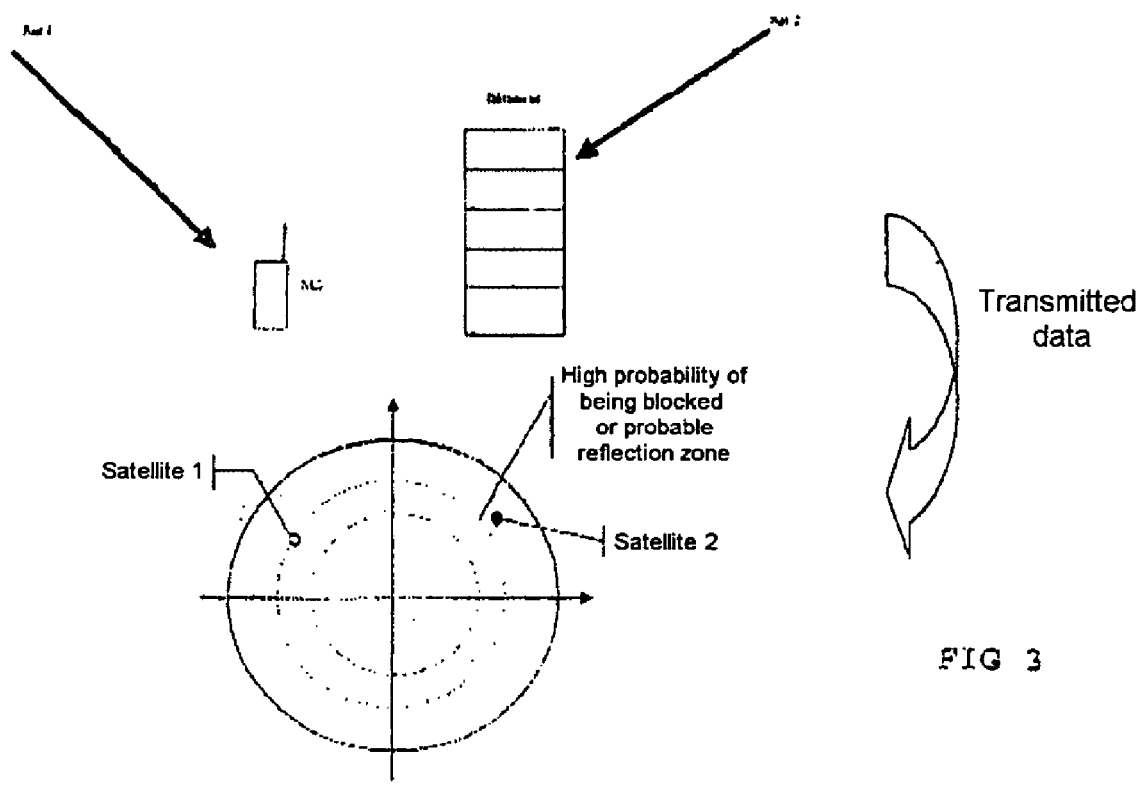
FIG. 3 is an explanatory diagram relating to an alternative embodiment involving the transmission of masking probability data.

FIG. 3 shows the method. The MS is at the center of the cell. A building masks a portion of the field of view, constituting an azimuth/elevation mask. That masking is transmitted to the MS in the assistance data in the form of a masking probability density in a given direction.

The invention claimed is:

1. Method of determining the position of a mobile terminal (UE), including a step of said terminal (UE) acquiring pseudo-random codes modulating signals received from satellites (SN) in view belonging to a constellation (CS) of positioning satellites and related to a reference time by comparison with signal replicas resulting from hypotheses, and a step of determining the position of said terminal (UE) from said acquired codes and from navigation data contained in said signals, which method is characterized in that, in the acquisition step, i) assistance data is transmitted to said terminal (UE) representing an approximate reference time and its approximate position, ii) estimated positions of said constellation (CS) of satellites (SN), estimated distances between said terminal (UE) and each of said satellites (SN) in view and associated Doppler effects are determined as a function of pairs of hypotheses relating to said approximate reference time and said approximate position, iii) a signal replica is determined for each pair of hypotheses corresponding to said estimated positions and distances and to said associated Doppler effects over a selected time interval, and iv) the pair of hypotheses corresponding to the signal replica having a maximum correlation with the signal received during said time interval is selected in order to determine said pseudo-random codes modulating said received signals.

2. Method according to claim 1, characterized in that said assistance data comes from an assistance server (SE) connected to a cellular communication network of said terminal (UE).

3. Method according to claim 2, characterized in that said assistance data is transmitted to said terminal (UE) via said cellular communication network.

4. Method according to claim 2, characterized in that said approximate position represents the cell in which said terminal (UE) is situated when it requests said assistance data.

5. Method according to claim 4, characterized in that the acquisition timing clock of said terminal (UE) is slaved to the timing clock of the base station (BTS) managing the cell in which it is situated.

6. Method according to claim 1, characterized in that selecting a signal replica consists in determining for each signal replica a function representing its energy of correlation with said received signal during the time interval and then retaining the signal replica whose energy is the highest.

7. Method according to claim 1, characterized in that said assistance data comprises complementary navigation data selected in a group comprising at least ephemerides of the satellites (SN) in view, first time corrections of said satellites in view representing the time difference between said reference time and their timing clock, and second time corrections representing disturbances induced by the ionosphere to the propagation of the signals transmitted by said satellites (SN) in view.

8. Method according to claim 1, characterized in that said assistance data comprises complementary navigation data coming from an augmentation system (SG) connected to the satellite navigation system (CS).

9. Method according to claim 1, characterized in that said assistance data comprises data representing a three-dimensional model of the cell in which said requesting terminal (UE) is situated.

10. Method according to claim 1, characterized in that information data representing the position of the terminal (UE) is stored in corresponding relationship to an identifier of the cell in which it is situated.

11. Method according to claim 10, characterized in that said position is also stored in corresponding relationship to auxiliary data representing the quality of said information data transmitted.

12. Method according to claim 10, characterized in that said approximate position represents the cell in which said terminal (UE) is situated when it requests said assistance data, and further characterized in that a three-dimensional model of said communication network is generated from said cell identifiers and said information data and/or corresponding auxiliary data, after which said three-dimensional model of the communication network is stored.

13. Method according to claim 9, characterized in that a three-dimensional model of said communication network is generated from said cell identifiers and said information data and/or corresponding auxiliary data, after which said three-dimensional model of the communication network is stored, and further characterized in that said three-dimensional cell model transmitted to said terminal (UE) is a portion of the three-dimensional model of the communication network.

14. Method according to claim 1, characterized in that measurements are effected representing the dynamics of said mobile terminal (UE), a speed, an acceleration and a variation of acceleration relative to each satellite (SN) in view are estimated from said measurements and from said assistance data, after which an induced phase is deduced therefrom, and said signal replica is determined taking account of said induced phase.

15. Use of the method according to claim 1 for multiple-access phase-modulated L-band signals.

16. Use according to claim 15, characterized in that said multiple-access phase-modulation is effected in accordance with the W-CDMA technique.

17. Use of the method according to claim 1 in RNSS type satellite positioning networks (SN).

18. Use according to claim 17, characterized in that said satellite positioning network (SN) is of the GPS type.

19. Mobile terminal (UE) comprising means (CR) for acquiring pseudo-random codes modulating signals received from satellites (SN) in view belonging to a constellation (CS) of positioning satellites and related to a reference time by comparison with signal replicas resulting from hypotheses, and computation means (MC1-MC3) for determining the position of said terminal (UE) from said acquired codes and from navigation data contained in said received signals, which terminal is characterized in that said acquisition means (CR), on receiving assistance data representing an approximate reference time and the approximate position of said terminal (UE), determine estimated positions of said constellation of satellites (SN), estimated distances between said terminal (UE) and each of said satellites (SN) in view and associated Doppler effects as a function of pairs of hypotheses relating to said approximate reference time and said approximate position, and then determine a signal replica for each pair of hypotheses corresponding to said estimated positions and distances and to said associated Doppler effects over a selected time interval, and select the pair of hypotheses corresponding to the signal replica having a maximum correlation with the received signal during said time interval in order to determine said pseudo-random codes modulating said received signals.

20. Terminal according to claim 19, characterized in that it is adapted to communicate within a cellular communication network each cell of which is managed by a base station (BTS) and said approximate position represents the cell in which it is situated when it requests said assistance data.

21. Terminal according to claim 20, characterized in that said acquisition means (CR) comprise a timing clock slaved to the timing clock of the base station (BTS) managing the cell in which it is situated.

22. Terminal according to claim 19, characterized in that said acquisition means (CR) select a signal replica by determining for each signal replica a function representing its energy of correlation with said signal received during the time interval and thereafter retain the signal replica having the highest energy.

23. Terminal according to claim 19, characterized in that said assistance data comprises complementary navigation data selected in a group comprising at least ephemerides of the satellites (SN) in view, first time corrections of said satellites (SN) in view representing the time difference between said reference time and their timing clock, and second time corrections representing disturbances induced by the ionosphere to the propagation of the signals transmitted by said satellites (SN) in view.

24. Terminal according to claim 19, characterized in that said assistance data comprises data representing a three-dimensional model of the cell in which said requesting terminal (UE) is situated.

25. Terminal according to claim 24, characterized in that it determines said position with the aid of said data representing a three-dimensional cell model received.

26. Terminal according to claim 19, characterized in that said assistance data comprises complementary navigation data coming from an augmentation system (SG) connected to said satellite navigation system (CS).

27. Terminal according to claim 22, characterized in that it transmits to an assistance server (SE) of said cellular communication network information data representing its position so that said information data can be stored in a database (BD) in corresponding relationship to an identifier of the cell in which it is situated.

28. Terminal according to claim 19, characterized in that it comprises a micro-inertia measuring device (DM) for delivering measurements representing the dynamics of said terminal and said acquisition means (CR) are adapted to estimate from said measurements and said assistance data a speed, an acceleration and a variation of acceleration relative to each satellite (SN) in view, to deduce therefrom an induced phase, and then to determine said signal replica taking account of said induced phase.

29. Terminal according to claim 28, characterized in that said measuring device (DM) takes the form of a micro-inertia micro-electro-mechanical system.

30. Assistance server (SE) for a cellular communication network communicating with mobile terminals (UE), characterized in that it transmits assistance data via said communication network to mobile terminals (UE) according to claim 19 after receiving requests emanating therefrom.

31. Server according to claim 30, characterized in that it transmits to each requesting terminal (UE) assistance data comprising complementary navigation data selected in a group comprising at least ephemerides of the satellites (SN) in view, first time corrections of said satellites (SN) in view from said terminal (UE) representing the time difference between said reference time and the timing clock of the terminal (UE), and second time corrections representing disturbances induced by the ionosphere to the propagation of the signals transmitted by said satellites (SN) in view from said terminal and data representing a three-dimensional model of the cell in which said requesting terminal (UE) is situated.

32. Server according to claim 30, characterized in that it comprises receiving means (R) for receiving messages from a satellite navigation system (CS) and transmitting to each requesting terminal (UE) assistance data comprising navigation data extracted from messages coming from said satellite navigation system (CS).

33. Server according to claim 32, characterized in that said receiver means (R) receive messages from an augmentation system connected to said satellite navigation system (CS) and transmit to each requesting terminal (UE) assistance data comprising complementary navigation data extracted from messages coming from said augmentation system and representing said satellite navigation system (CS).

34. Server according to claim 30, characterized in that it comprises processing means (PM) which, on receiving information data representing the position of a terminal (UE), store said information data in a database (BD) in corresponding relationship to an identifier of the cell of a cellular communication network in which said terminal (UE) is situated.

35. Server according to claim 34, characterized in that said processing means (PM) determine auxiliary data representing the quality of said received information data and store that auxiliary data in said database (BD) in corresponding relationship to said cell identifier and said information data representing the position of the terminal (UE).

36. Server according to claim 34, characterized in that said processing means (PM) generate a three-dimensional model of said communication network from said cell identifiers and said information data and/or corresponding auxiliary data and then store said three-dimensional model of the communication network in said database (BD).

37. Server according to claim 30, characterized in that said processing means (PM) generate a three-dimensional model of said communication network from said cell identifiers and said information data and/or corresponding auxiliary data and then store said three-dimensional model of the communication network in said database (BD), and further characterized in that said processing means (PM) extract from said database (BD) a portion of said three-dimensional model of the communication network representing said three-dimensional model of the cell in which said requesting terminal (UE) is situated in order to transmit it to it.

38. Server according to claim 30, characterized in that said processing means (PM) extract from a database (BD) storing portions of a three-dimensional model of said communication network in corresponding relationship to cell identifiers the portion of the model stored in corresponding relationship to the identifier of the cell in which a requesting terminal (UE) is situated in order to transmit said extracted portion to it.

39. Use of the mobile terminal (UE) according to claim 19 for multiple-access phase-modulated L-band signals.

40. Use according to claim 39, characterized in that said multiple-access phase-modulation is effected in accordance with the W-CDMA technique.

41. Use of the assistance server (SE) according to claim 30 for multiple-access phase-modulated L-band signals.

42. Use according to claim 41, characterized in that said multiple-access phase-modulation is effected in accordance with the W-CDMA technique.

43. Use of the mobile terminal (UE) according to claim 19 in RNSS type satellite positioning networks (SN).

44. Use according to claim 43, characterized in that said satellite positioning network (SN) is of the GPS type.

45. Use of the assistance server (SE) according to claim 30 in RNSS type satellite positioning networks (SN).

46. Use according to claim 45, characterized in that said satellite positioning network (SN) is of the GPS type.

* * * * *